United States Patent
Song et al.

(10) Patent No.: US 9,974,197 B2
(45) Date of Patent: May 15, 2018

(54) STRUCTURE FOR DISPLAY APPARATUS AND DISPLAY APPARATUS INCLUDING THE SAME

(71) Applicant: Samsung Display Co., Ltd, Yongin-si, Gyeonggi-do (KR)

(72) Inventors: Hyun-Hwa Song, Hwaseong-si (KR); Kang-Woo Lee, Seoul (KR); Seung Hwan Chung, Asan-si (KR); Young Jun Choi, Asan-si (KR)

(73) Assignee: Samsung Display Co., Ltd. (KR)

( * ) Notice: Subject to any disclaimer, the term of this patent is extended or adjusted under 35 U.S.C. 154(b) by 85 days.

(21) Appl. No.: 15/007,958

(22) Filed: Jan. 27, 2016

(65) Prior Publication Data

US 2016/0238837 A1   Aug. 18, 2016

(30) Foreign Application Priority Data

Feb. 13, 2015 (KR) .................. 10-2015-0022414

(51) Int. Cl.

| G02B 27/00 | (2006.01) |
|---|---|
| G02B 7/182 | (2006.01) |
| H05K 5/02 | (2006.01) |
| G02F 1/1333 | (2006.01) |
| G02F 1/1335 | (2006.01) |

(52) U.S. Cl.
CPC ......... *H05K 5/02* (2013.01); *G02F 1/133308* (2013.01); *G02F 1/133608* (2013.01); *G02F 1/133605* (2013.01); *G02F 2001/133311* (2013.01); *G02F 2001/133314* (2013.01)

(58) Field of Classification Search
CPC ...... G02B 7/00; G02B 7/182; G02B 27/0006; G02F 1/1333; G02F 1/133308; G02F 1/133314; H05K 5/02
USPC ............................ 359/507, 514, 871; 349/58
See application file for complete search history.

(56) References Cited

U.S. PATENT DOCUMENTS

| 8,158,450 | B1 * | 4/2012 | Sheats | H01L 31/02245 |
| | | | | 136/259 |
| 8,702,296 | B2 * | 4/2014 | Choi | G02F 1/133308 |
| | | | | 362/602 |
| 9,706,607 | B2 * | 7/2017 | Kim | H05B 33/04 |
| 9,799,786 | B2 * | 10/2017 | Kim | F24J 2/5211 |
| 2010/0157585 | A1 * | 6/2010 | Diekmann | F21S 6/002 |
| | | | | 362/228 |
| 2014/0158114 | A1 * | 6/2014 | Ishida | G02B 7/182 |
| | | | | 126/688 |
| 2014/0239259 | A1 * | 8/2014 | Lim | H01L 51/5281 |
| | | | | 257/40 |
| 2014/0306192 | A1 * | 10/2014 | Han | H01L 51/56 |
| | | | | 257/40 |

(Continued)

FOREIGN PATENT DOCUMENTS

| JP | 2008-282615 A | 11/2008 |
| KR | 10-2013-0049895 A | 5/2013 |

(Continued)

*Primary Examiner* — Frank Font
(74) *Attorney, Agent, or Firm* — Innovation Counsel LLP

(57) ABSTRACT

Provided is a structure for a display apparatus. The structure for a display apparatus includes: a chassis having a plate shape and provided with a plurality of through holes; a reflection layer formed on one surface of the chassis: and at least one moisture barrier layer formed on the other surface of the chassis.

16 Claims, 3 Drawing Sheets

(56) References Cited

U.S. PATENT DOCUMENTS

2014/0345791 A1* 11/2014 Son ..................... B32B 37/0046
                                                                    156/228
2016/0343988 A1* 11/2016 Meyer ................. H01L 51/5256
2017/0115521 A1*  4/2017 McCormick ........ G02F 1/13439
2017/0237027 A1*  8/2017 Lee ..................... H01L 51/0097
                                                                    257/40

FOREIGN PATENT DOCUMENTS

| KR | 10-1282029 B1 | 7/2013 |
| KR | 10-1324241    | 11/2013 |

\* cited by examiner

STRUCTURE FOR DISPLAY APPARATUS AND DISPLAY APPARATUS INCLUDING THE SAME

CROSS-REFERENCE TO RELATED APPLICATION

This application claims priority to and the benefit of Korean Patent Application No. 10-2015-0022414 filed in the Korean Intellectual Property Office on Feb. 13, 2015, the entire contents of which are incorporated herein by reference.

BACKGROUND (a) Field of the Disclosure

The present disclosure relates to a structure for a display apparatus and a display apparatus including the same.

(b) Description of the Related Art

To keep pace with consumer demand for a larger screen, the size of image display apparatuses, like the TV, has been increasing. A chassis used for mounting of parts, such as a reflective element of a light source, is generally equipped in the image display apparatus and made of a metal material to maintain a predetermined stiffness. Therefore, as the size of the screen increases, so do the size and weight of the chassis.

As a further consequence, when the weight of the image display apparatus increases, transportation costs also increase, and a worker may have difficulty installing the image display apparatus.

The above information disclosed in this Background section is only for enhancement of understanding of the background of the present system and method and therefore may contain information that does not form the prior art that is already known in this country to a person of ordinary skill in the art.

SUMMARY

The present system and method provide a structure for a display apparatus, and a display apparatus including the same, having advantages of implementing weight reduction.

An exemplary embodiment provides a structure for a display apparatus, including: a chassis having a plate shape and provided with a plurality of through holes; a reflection layer formed on one surface of the chassis: and at least one moisture barrier layer formed on the other surface of the chassis.

The plurality of through holes may be formed at a uniform interval from each other.

The plurality of through holes may be formed in a region adjacent to an edge of the chassis.

The plurality of through holes may be formed at a central portion of the chassis.

The moisture barrier layer may be configured of a plurality of moisture barrier films and the plurality of moisture barrier films may be formed to have a size larger than that of the through holes and cover each of the through holes.

The chassis may be made of a metal material.

The moisture barrier layer may be coated with a liquid getter.

A liquid getter may include a calcium oxide (CaO)-based material.

Another embodiment provides a display apparatus including the structure for a display apparatus.

According to an exemplary embodiment, the structure for a display apparatus has the through holes formed on the chassis and the moisture barrier layer formed on one surface of the chassis. Therefore, even if the weight of the chassis is increased due to an increase in the size of the structure for a display apparatus, it is possible to implement weight reduction because the weight of the chassis is reduced by having the chassis material in the through holes removed. Further, the moisture barrier layer prevents the reflection layer from being damaged due to moisture introduced through the through holes.

DETAILED DESCRIPTION OF THE EMBODIMENTS

Figure 1:
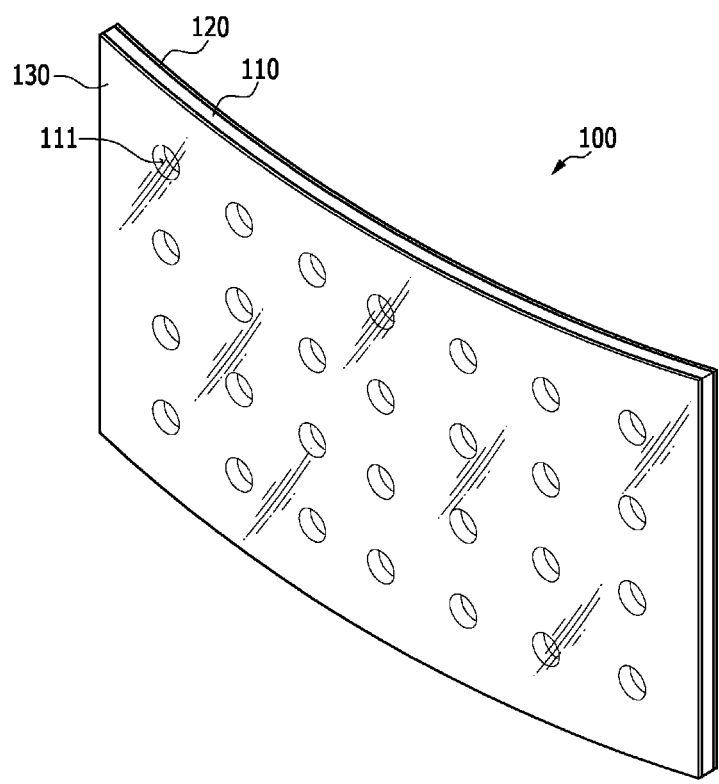
FIG. 1 is a perspective view of a structure for a display apparatus according to an exemplary embodiment.

Hereinafter, the present system and method are described more fully hereinafter with reference to the accompanying drawings in which exemplary embodiments of the present system and method are shown. The present system and method may be implemented in various different forms and are not limited to the exemplary embodiments provided herein.

Accordingly, the drawings and description are illustrative in nature and not restrictive. Like reference numerals designate like elements throughout the specification.

In addition, in several exemplary embodiments, components having the same configuration are representatively described using the same reference numerals in an exemplary embodiment, and only components different from those of the exemplary embodiment are described in the other exemplary embodiments.

Throughout this specification, when a part is described as "being connected" with another part, the part may be directly connected with the other part, or the part may be indirectly connected with the other part with one or more intervening elements interposed therebetween. In addition, unless explicitly described to the contrary, the word "comprise" and its variations, such as "comprises" or "comprising", imply the inclusion of stated elements but not the exclusion of other elements.

Figure 2:
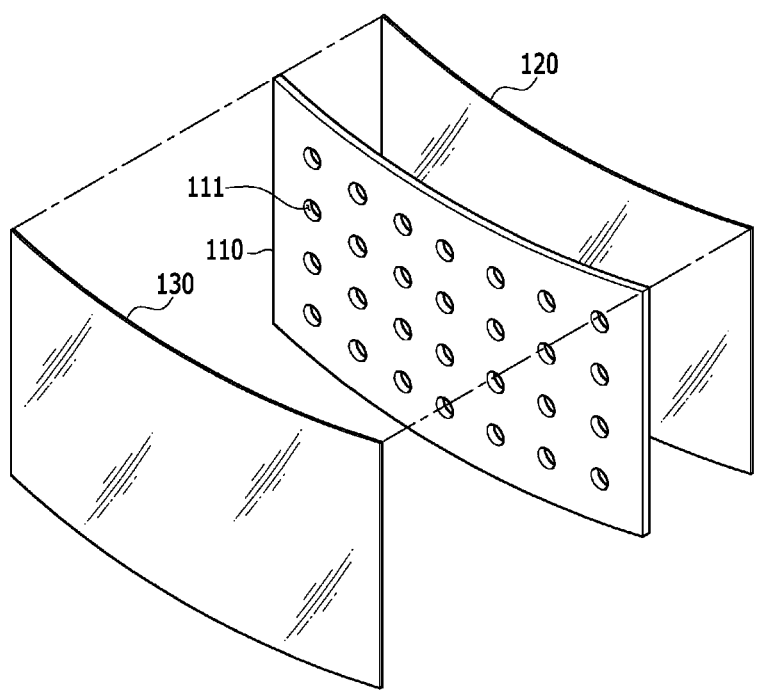
FIG. 2 is an exploded perspective view of a structure for a display apparatus according to the exemplary embodiment illustrated in FIG. 1.

FIG. 1 is a perspective view of a structure for a display apparatus according to an exemplary embodiment. FIG. 2 is an exploded perspective view of a structure for a display apparatus according to the exemplary embodiment illustrated in FIG. 1.

Referring to FIGS. 1 and 2, a structure 100 for a display apparatus according to an exemplary embodiment includes a chassis 110, a reflection layer 120, and a moisture barrier layer 130.

The chassis 110 has a plate shape and/or may be curved in shape. The chassis 110 is provided with a plurality of through holes 111. A material of the chassis 110 may be, for example, a metal material. For example, the chassis 110 may be made of stainless or aluminum alloy.

As the chassis 110 is made of metal, when the chassis 110 is used as the structure 100 for a display apparatus and is mounted with various parts, the chassis prevents the parts from being deformed while stably receiving the parts.

The plurality of through holes 111 may be formed at a predetermined interval from each other. The plurality of through holes 111 may be formed in a specific region of the chassis 110. For example, the plurality of through holes 111 may be formed in a region adjacent to edge of the chassis 110, or the plurality of through holes 111 may be formed at a central portion of the chassis 110.

One portion of the chassis 110 may be coupled with a light emitting device (not illustrated). When the structure 100 for a display apparatus according to the exemplary embodiment of FIG. 1 is equipped in the display apparatus, the light emitting device (not illustrated) may be used as a light source for the display apparatus. The light emitting device may emit red, green, and blue light.

Further, the chassis 110 may be provided with a package substrate (not illustrated) that is electrically connected to the light emitting device. Devices, such as a circuit board, a lead frame, etc., may be mounted on the package substrate. An example package substrate may include a circuit board like a PCB, MCPCB, MPCB, and FPCB, a lead frame, or the like. The light emitting device may be any device that emits light when an electrical signal is applied thereto. For example, a light emitting diode (LED) may be used as the light emitting device.

The reflection layer 120 is formed on one surface of the chassis 110. The reflection layer 120 reflects light generated from the light emitting device. The reflection layer 120 may reflect white light, which may be include a uniform mixture of three colors of light. The light irradiated from the light emitting device (not illustrated) may be reflected in any direction by the reflection layer 120.

The moisture barrier layer 130 is formed on the other surface of the chassis 110. The moisture barrier layer 130 may be coated with, for example, a liquid getter. The liquid getter may include, for example, a calcium oxide (CaO)-based material. As another example, the moisture barrier layer 130 may be a moisture barrier film. In this case, the moisture barrier layer 130 may be formed by attaching the moisture barrier film to the chassis 110 using an adhesive or an adhesive film. The moisture barrier layer 130 as described above may cover the through holes 111 of the chassis 110 to prevent external moisture from being permeated into the reflection layer 120 through the through holes 111.

A thickness of the moisture barrier layer 130 may range from 1 mm to 4 mm. When the thickness of the moisture barrier layer 130 is smaller than 1 mm, it may be difficult to block the external moisture. When the thickness of the moisture barrier layer 130 is larger than 4 mm, its weight increases and as a result, may have a negative effect on the objective of weight reduction.

In the structure 100 for a display apparatus according to the exemplary embodiment having the above-mentioned structure, the chassis 110 is provided with the through holes 111, and one surface of the chassis 110 is provided with the moisture barrier layer 130. Therefore, even if the weight of the chassis 110 is increased due to an increase in the size of the structure 100 for a display apparatus, it is possible to implement weight reduction because the weight of the chassis 110 is reduced by having the chassis material in the through holes 111 removed. Further, the moisture barrier layer 130 prevents the reflection layer 120 from being damaged due to the moisture introduced through the through holes 111.

Figure 3:
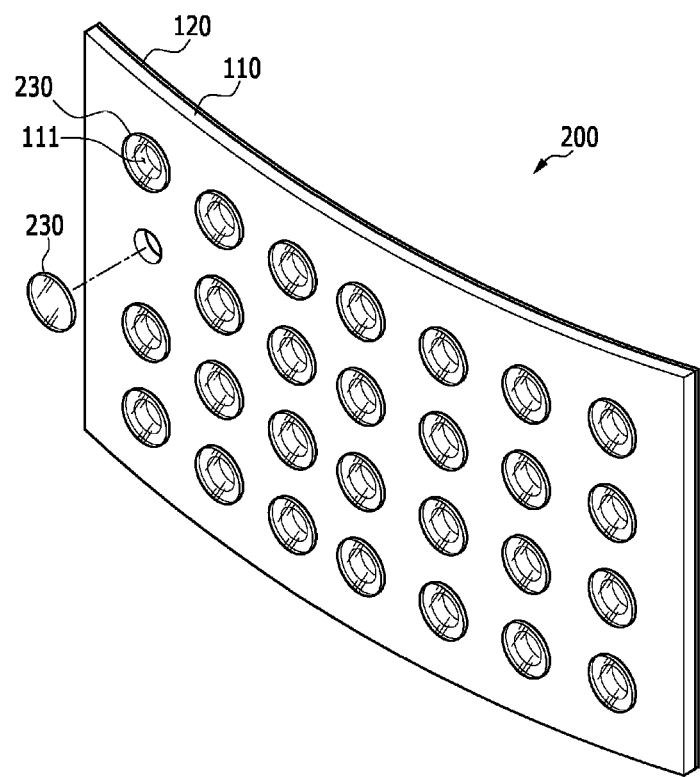
FIG. 3 is a perspective view of a structure for a display apparatus according to another exemplary embodiment.

FIG. 3 is a perspective view of a structure for a display apparatus according to another exemplary embodiment.

In a structure 200 for a display apparatus according to another exemplary embodiment, a moisture barrier layer 230 may be configured of a plurality of moisture barrier films 230. The plurality of moisture barrier films 230 may have a size larger than that of the through holes 111 and cover each of the through holes 111. For example, the plurality of moisture barrier films 230 may have a diameter larger than that of the through holes 111.

The structure 200 for a display apparatus according to another exemplary embodiment differs from the above-described structure 100 for a display apparatus (see FIG. 1) in that the moisture barrier layer 230 is configured of the plurality of moisture barrier films 230, whereas the moisture barrier layer 130 is configured by one connected piece spanning multiple through holes 111.

In this structure 200, when one of the plurality of moisture barrier film 230 is damaged during the manufacturing process or the handling process, maintenance may be completed by replacing only the damaged moisture barrier film. Therefore, the maintenance costs may be reduced and the replacement time may be shortened.

A display apparatus (not illustrated) according to an exemplary embodiment may include the structure 100 for a display apparatus having the foregoing structure. The structure 100 may be included in the display apparatus, like a monitor or a television, and thus may have various kinds of parts installed therein or be used for the reflective element of the light source. Further, the structure for a display apparatus according to an exemplary embodiment may be similar to or the same as a generally known television, and therefore a description thereof is omitted.

A display apparatus according to an exemplary embodiment includes the structure 200 for a display apparatus with the reduced weight, and thus the image display apparatus may be easily installed and transported.

While the presenty system and method have been described in connection with exemplary embodiments, the presenty system and method are not limited to the disclosed embodiments. On the contrary, the presenty system and method cover various modifications and equivalent arrangements included within the spirit and scope of the appended claims.

DESCRIPTION OF SYMBOLS 100, 200: Structure for display apparatus
110: Chassis
111: Through hole
120: Reflection layer
130, 230: Moisture barrier layer

What is claimed is:

1. A structure of an image display apparatus, comprising:
   a chassis curved in shape and provided with a plurality of through holes;
   a reflection layer directly contacting a surface of the chassis; and
   a barrier layer directly contacting another surface of the chassis.

2. The structure of claim 1, wherein: the through holes are formed at a uniform interval from each other.

3. The structure of claim 1, wherein: the through holes are formed in a region adjacent to an edge of the chassis.

4. The structure of claim 1, wherein: the through holes are formed at a central portion of the chassis.

5. The structure of claim 1, wherein: the barrier layer is configured of a plurality of barrier films, and the barrier films are formed to have a size larger than that of the through holes and cover each of the through holes.

6. The structure of claim 1, wherein: the chassis is made of a metal material.

7. The structure of claim 1, wherein: the barrier layer is coated with a liquid getter.

8. The structure of claim 7, wherein: the liquid getter includes a calcium oxide (CaO)-based material.

9. An image display apparatus including a structure of an image display apparatus, the structure comprising: a chassis curved in shape and provided with a plurality of through holes; a reflection layer directly contacting a surface of the chassis; and a barrier layer directly contacting another surface of the chassis.

10. The display apparatus of claim 9, wherein: the through holes are formed at a uniform interval from each other.

11. The display apparatus of claim 9, wherein: the through holes are formed in a region adjacent to an edge of the chassis.

12. The display apparatus of claim 9, wherein: the through holes are formed at a central portion of the chassis.

13. The display apparatus of claim 9, wherein: the barrier layer is configured of a plurality of barrier films, and the barrier films are formed to have a size larger than that of the through holes and cover each of the through holes.

14. The display apparatus of claim 9, wherein: the chassis is made of a metal material.

15. The display apparatus of claim 9, wherein: the barrier layer is coated with a liquid getter.

16. The display apparatus of claim 15, wherein: the liquid getter includes a calcium oxide (CaO)-based material.

\* \* \* \* \*